(12) United States Patent
Chaddha et al.

(10) Patent No.: US 6,222,885 B1
(45) Date of Patent: Apr. 24, 2001

(54) VIDEO CODEC SEMICONDUCTOR CHIP

(75) Inventors: Navin Chaddha, Bellevue, WA (US); Brian Von Herzen, Carson City, NV (US); Richard A. Wotiz, Saratoga, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/899,276

(22) Filed: Jul. 23, 1997

(51) Int. Cl.$^7$ ..................................................... H04N 7/18
(52) U.S. Cl. ................................ 375/240.22; 375/240.03
(58) Field of Search ................................... 348/422, 390, 348/398, 384, 385, 414, 417, 418; 382/232, 233, 240, 242; 375/240.22

(56) References Cited

U.S. PATENT DOCUMENTS

| | | | |
|---|---|---|---|
| 5,602,589 | * | 2/1997 | Vishwanath et al. ................. 348/422 |
| 5,812,788 | * | 9/1998 | Agarwal ............................... 395/200 |
| 5,844,612 | * | 12/1998 | Israelsen ............................... 348/414 |
| 5,872,784 | * | 2/1999 | Rostoker et al. ................... 348/845.2 |
| 5,892,549 | * | 4/1999 | Feng ..................................... 348/422 |
| 5,909,513 | * | 6/1999 | Liang et al. .......................... 382/253 |
| 5,926,226 | * | 7/1999 | Proctor et al. ....................... 348/422 |

OTHER PUBLICATIONS

Chaddha, H., et al., "Hierarchical Vector Quantization of Perceptually Weighted Block Transforms", *IEEE*, pp. 3–12, (1995).

Sayood, K., *Introduction to Data Compression*, San Francisco, CA: Morgan Kaufman Publishers, Inc., 222–28, (Jan. 1996).

* cited by examiner

*Primary Examiner*—Andy Rao
(74) *Attorney, Agent, or Firm*—Schwegman, Lundberg, Woessner & Kluth, P.A.

(57) ABSTRACT

A semiconductor chip integrating various functional blocks of a video codec for use in a system for real time record and playback of motion video through a computer interface such as a PC-compatible parallel port is disclosed. An innovative combination of the hardware implementing data compression and decompression based on a vector quantization algorithm with video input/output port and computer interface integrated on a single semiconductor chip provides for a cost-effective solution to processing of continuous-steam video and audio data in real time.

17 Claims, 3 Drawing Sheets

VIDEO CODEC SEMICONDUCTOR CHIP

RELATED APPLICATION

This application is related to commonly-assigned U.S. patent application Ser. No. 08/819,579, entitled "Method and Apparatus for Table-Based Compression with Embedded Coding," filed Mar. 14, 1997, and hereby incorporated by reference in its entirety for all purposes.

BACKGROUND OF THE INVENTION

The present invention relates in general to signal compression-decompression (codec) hardware, and in particular to an semiconductor implementation of novel codec circuitry used for interactive video applications and the like.

As the computer is becoming a more common means of human communication and interaction, the demand is rising for the interaction to be more immediate and complete. This has led to the development of technologies that facilitate interactive video and collaborative video applications such as video conferencing. In most cases, the raw data requirements for such applications far exceed available bandwidth, so data compression is necessary to meet the demand.

Most compression schemes operate on digital images that are expressed as a two-dimensional array of picture elements (pixels) each with one (as in a monochrome or gray-scale image) or more (as in a color image) values assigned to a given pixel. Commonly, a color image is treated as a superposition of three independent monochrome images for purposes of compression.

State-of-the-art compression schemes have been promulgated as standards by an international Motion Picture Experts Group; the current standards are MPEG-1 and MPEG-2. MPEG-1 addresses compressed video bitstream of typically between 0.5 to 1.8 MB/s, while MPEG-2 deals with the faster rates of typically 4 to 9 MB/s. These standards involve more complex compression algorithms based on discrete cosine transform, as well as motion compensation techniques to achieve higher compression ratios with higher resolution. As a result MPEG-based compression-decompression (codec) hardware are considerably more expensive. MPEG-2 for example is primarily intended for broadcast TV, where an encoder with a high price tag (in the range of tens of thousands of dollars) serves multitudes of television viewers each with a set-top box. MPEG is therefore suited for limited applications involving playback of video encoded off-line.

For wider consumer applications such as the PC multimedia market, however, MPEG-based codecs are not only prohibitively expensive, their compression effectiveness is non-optimal, encoding requirements excessive, and scalability too limited. To capture and manipulate images in real time, the affordable alternative to the average PC user remains products that can only perform still frame video capture.

There is therefore a need for a cost-effective image compression-decompression system that enables for example computer users to process a continuous stream of video data in real time.

SUMMARY OF THE INVENTION

The present invention offers a more cost-effective system for real time record and playback of motion video through a computer interface port such as a PC-compatible parallel port. Broadly, the invention combines hardware implementing data compression and decompression based on a vector quantization algorithm along with video input/output port and computer interface to enable a PC-type apparatus to process continuous-stream video and audio data in real time. The video compression hardware, according to a preferred embodiment of the present invention, is packaged in a separate plug-in module that externally connects to, for example, a PC-compatible parallel port. In a specific embodiment of the present invention, a customized integrated circuit implementing the compression and decompression algorithms is combined with off-the-shelf video encoder and decoder components as well as one or more memory devices.

Accordingly, in one embodiment, the present invention provides a data compression-decompression (coded) apparatus which includes a video input/output port having an input terminal for receipt of video signal, and an output terminal; codec logic coupled to the video input/output port for implementing hierarchical vector quantization compression-decompression algorithm; and a computer interface having connectors for coupling to a host computer via a computer bus.

In another embodiment, the present invention provides an integrated circuit for compressing and decompressing video data that includes a video port coupled to receive digital component video signal, a scaler and an interpolator coupled between the video port and a first memory interface, a second memory interface coupled to the first memory interface, and a parallel port interface coupled to the second memory interface. The integrated circuit further includes an audio port coupled to the second memory interface, a word wrap block coupled between the second memory interface and the parallel port, and an unwrap block coupled between the second memory interface and the first memory interface.

In yet another embodiment, the present invention provides a system for processing video and audio data including the integrated circuit (IC) as described above, a video encoder and decoder coupled to the video port of the IC, audio encoder and decoder coupled to the audio port of the IC, a first memory unit coupled to the first memory interface of the IC for storing data representing compression tables, and a second memory unit coupled to said second memory interface of the IC for storing intermediate video and audio data.

In a further embodiment, the present invention provides an interactive video station including a computer coupled to a camera, an interface mechanism coupled to the computer, and a plug-in module incorporating the system described above for processing video and audio signals interactively.

A better understanding of the nature and advantages of the video compression and decompression system of the present invention may be had with reference to the detailed description and the diagrams below.

DESCRIPTION OF THE PREFERRED EMBODIMENT

Figure 1:
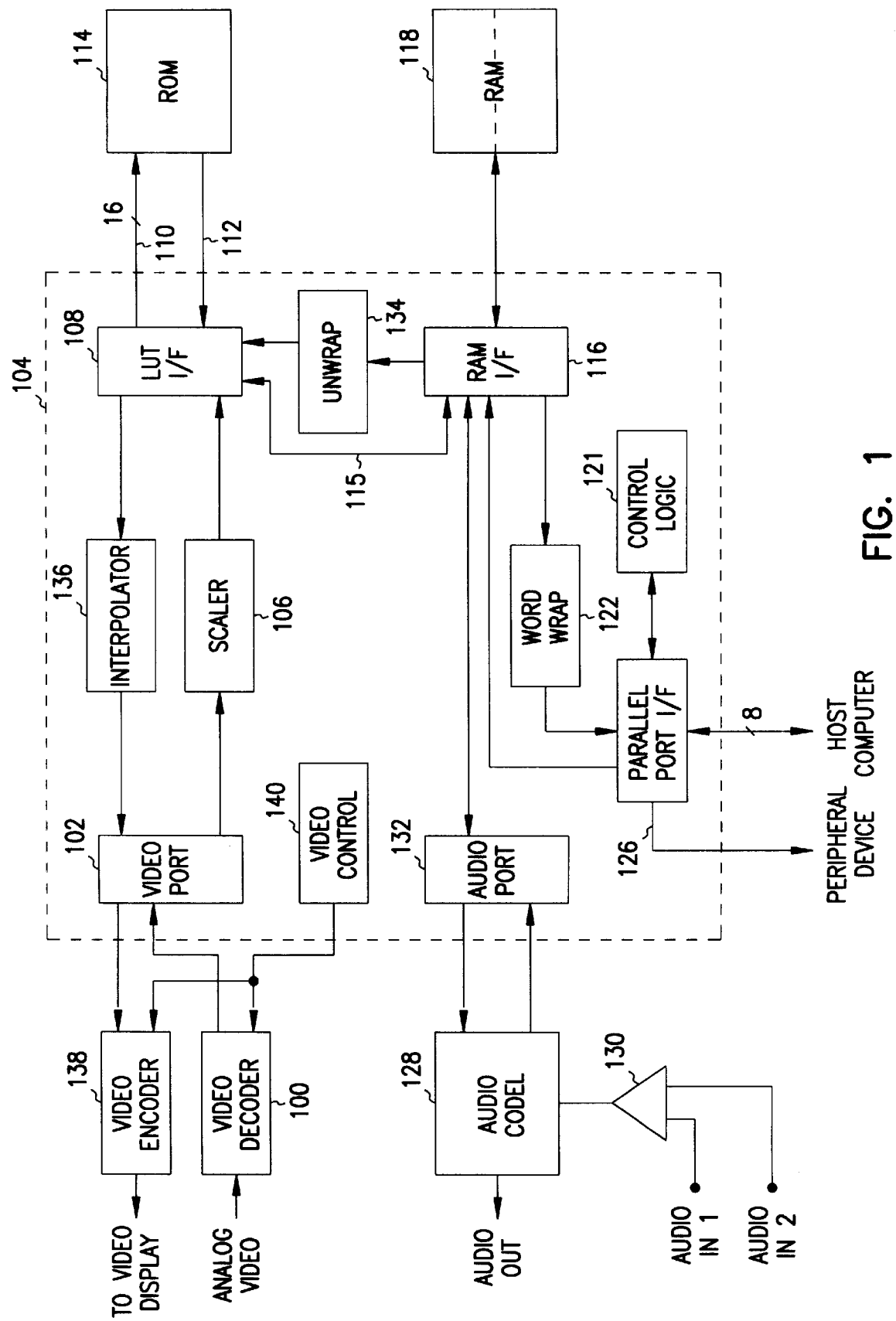
FIG. 1 is a block diagram of a video and audio data processing system according to one embodiment of the present invention.

Referring to FIG. 1, there is shown a block diagram of the system for processing video and audio data as defined by the present invention. According to the exemplary embodiment shown in FIG. 1, the system of the present invention combines standard (i.e., off the shelf) video/audio and memory components with a customized integrated circuit that performs programmable compression and decompression using a table-based hierarchical vector quantization algorithm. Accordingly, along the record path, the system includes a video decoder 100 that receives analog video input signal (e.g., composite and/or S-video) and generates digitized (e.g., 8 bit) video signal in a selected YCrCb format such as 4:2:2 or 4:2:0.

The digitized video signal is applied to a video port 102 that is implemented inside a customized codec integrated circuit (IC) 104. Inside codec IC 104, the resolution of the digital video signal is then scaled by a scaler 106. Scaler 106 performs a first level compression by lowering the data rate from for example 640 pixels per line to 320 pixels per line by averaging two pixel values into one. The output of scaler 106 is applied to a first memory (or lookup table) interface LUT I/F 108 that interfaces with a memory circuit 114 via, for example, a 19 bit wide address bus 110 and a 16 bit wide data bus 112. Memory circuit 114 is preferably a read only memory (ROM) device that stores the various index look up tables (LUTs) for multiple stages of quantization.

A bidirectional bus 115 connects LUT I/F 108 to a second memory interface RAM I/F 116. RAM I/F 116 facilitates the interface with a second memory 118 that is preferably of random access memory (RAM) type. RAM 118 provides the frame buffer that stores the results from the ROM look up tables (i.e., coefficients for an entire frame).

Continuing along the record path, RAM I/F 116 supplies the compressed data from the frame buffer (RAM 118) to a parallel port interface, PP I/F 120, through a word wrap block 122. Word wrap block 122 performs a 9-bit to 8-bit conversion by packing one bit (e.g., LSB) of eight 9-bit values into a single 8-bit word (or a byte). Thus, eight 9-bit samples are transferred in nine bytes through an 8-bit wide port that communicates with a computer through an 8-bit bus 124. PP I/F 120 includes a plurality of registers (e.g., 120 bytes) of, for example, FIFO type, and various state machines to control the interface and handshaking protocols with the PC through 8-bit parallel bus 124. It is to be understood that while the terminology "parallel port" is used herein to describe the type of interface, other types of interface configurations can be used per the requirements of the host computing system which may be a PC or a network computer (NC), or any one of a variety of emerging network appliances.

To co-exist with other peripheral devices, PP I/F 120 also provides a bypass connector bus 126. Bypass connector bus 126 allows the computer to communicate with, for example, a printer through PP I/F 120 when the port is not used by the video circuitry. A control logic block 121 connects to PP I/F 120 via a bidirectional bus. Control logic 121 receives configuration control information from the host computer (via PP I/F 120) and controls the parallel port mode setting as well as the configuration (e.g., set up commands) for the various other blocks.

The audio path includes an external audio codec device 128 that receives, via an amplifier 130, analog audio signal from, preferably, one of two audio input channels. Audio codec 128 performs an analog to digital conversion at an exemplary sample rate of about 8 KHz controlled by the pixel clock. Audio data may be compressed using different compression techniques such as µLaw compression, to compress, for example, 12 bits down to 8 bits. The 8-bit audio sample is then applied to an internal audio port 132 that connects to RAM I/F 116 via a bidirectional bus. Audio data is sent to RAM 118 after each video frame is processed and is stored in a portion of RAM 118 dedicated to audio data. The audio data may be written into RAM 118 during the vertical and horizontal blanking interval, and during frames that are not processed.

In playback mode, compressed data is received from the host computer at PP I/F 120 where data is temporarily stored in FIFO registers. Every scan line, 8-bit data is sent from PP I/F 120 directly to RAM I/F 116 and is then transferred to RAM 118 until an entire field of data is stored therein. Video data is then read out of RAM 118 and applied to LUT I/F 108 through RAM I/F 116. Depending on the value being read from RAM 118 (i.e., Y or Cb/Cr) video data is transferred to LUT I/F 108 either directly (via bus 115) or through an unwrap block 134. Unwrap block 134 performs the opposite function of word wrap block 122 (i.e., 8 bit to 9 bit conversion). The data read from RAM 118 is used by LUT I/F 108 to address ROM 114. Addressed pixel information is then read from ROM 114 and applied to an interpolator 136 via LUT I/F 108.

Interpolator 136 horizontally interpolates between adjacent samples to convert for example 320 pixels per line to 640 pixels per line at its output. Horizontal interpolation is done by an arithmetic averaging of the two adjacent pixels. Vertical interpolation can be done by averaging a pair of pixels from adjacent lines. Data at the output of interpolator 136 is then sent to video port 102 which supplies the data to an external video encoder 138. The output of video encoder 138 drives the video display.

The operation of the system of FIG. 1 will be described in greater detail hereinafter. Video data is preferably processed by IC 104 in 8-bit 4:2:2 YCrCb format, at square-pixel data rates, and in real-time in CIF and QCIF modes, and one frame at a time in 4CIF mode. In the record mode, scaling is done by averaging multiple pixel values. For horizontal scaling, input values are averaged, and for vertical Y scaling, the values (after any horizontal scaling) are combined with the data from previous lines already in the buffer (if any). For vertical Cr,Cb scaling, all odd lines of each field are dropped before further processing, resulting in a data format similar to 4:2:0 sampling. This results in a 1:2 scaling of the Cr,Cb data. Any further scaling will be done in the same way as Y scaling, by combining values from multiple lines.

Exemplary pixel resolutions and scaling ratios supported by the system of the present invention are shown in Table I below. Selection of the desired resolution and fields to be processed is made in response to set up commands generated by control logic 121.

TABLE I

| Format | Input resolution | Scaling | Scaled resolution |
|---|---|---|---|
| Luminance (Y) data | | | |
| 4CIF | 640 × 480 | 1:1 × 1:1 | 640 × 480 |
| CIF | 640 × 240 | 1:2 × 1:1 | 320 × 240 |
| QCIF | 640 × 240 | 1:4 × 1:2 | 160 × 120 |
| Chrominance (Cr, Cb) data | | | |
| 4CIF | 320 × 480 | 1:1 × 1:2 | 320 × 240 |
| CIF | 320 × 240 | 1:2 × 1:2 | 160 × 120 |
| QCIF | 320 × 240 | 1:4 × 1:4 | 80 × 60 |

The present invention uses hierarchical vector quantization as the preferred compression algorithm. Using this algorithm, video data compression is accomplished by processing each block of data in up to three stages, with each stage reducing the data size by half. At each stage, each pair of N-bit data values is concatenated together to form a 2N-bit word, which is used to address a look up table in ROM 114. The value read from ROM 114 then becomes the input to the next stage and the value read during the last stage becomes the compressed output value.

Figure 2:
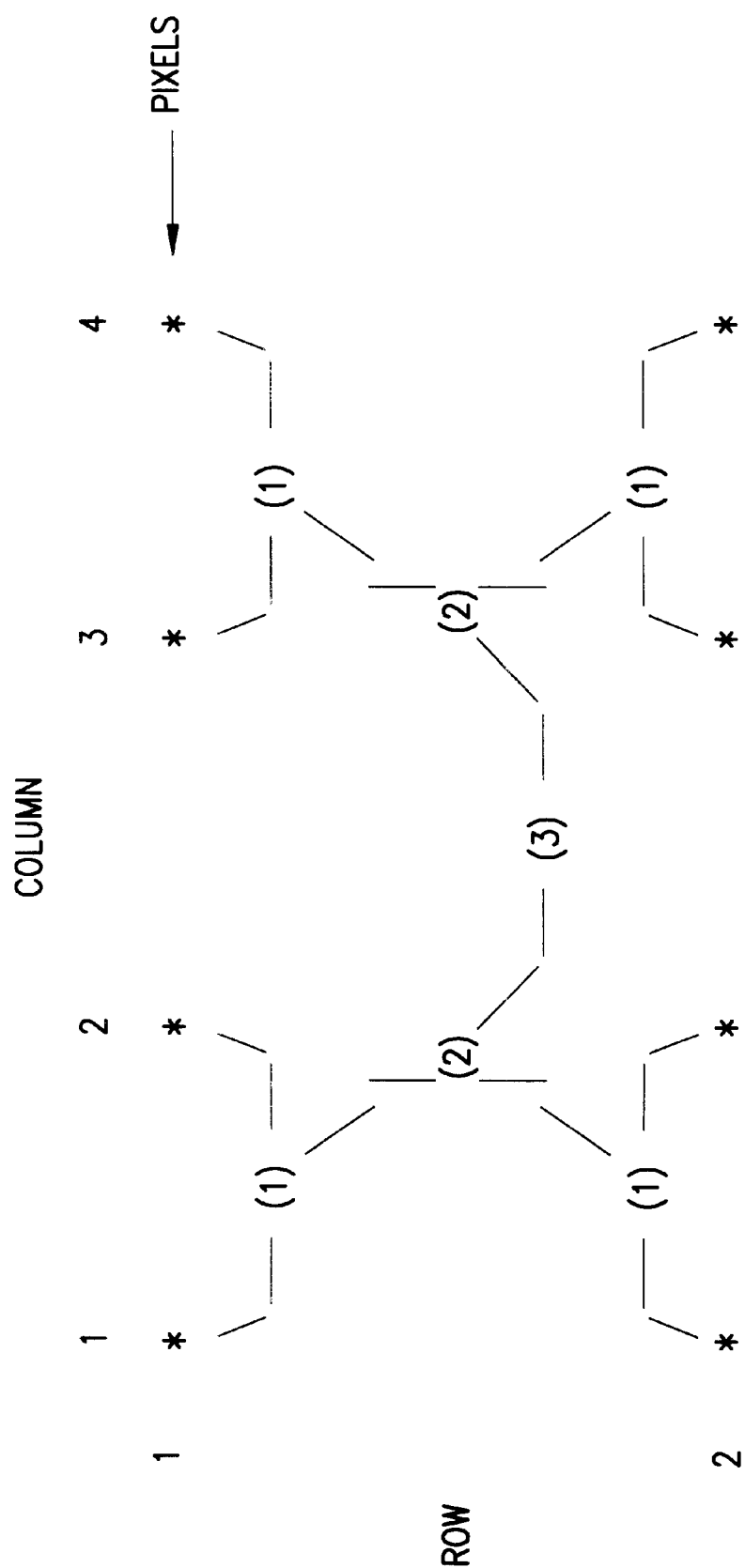
FIG. 2 shows a simplified diagram of a preferred compression scheme used in the system of the present invention.

FIG. 2 is a simplified diagram showing how a 4×2 block is processed in three stages. The stage numbers are shown in parentheses for each stage. When operating in a two-stage mode, only one (left or right) half of the diagram is used, showing a 2×2 block. The actual number of stages used can vary from two to three, as specified by a setup command. Maximum data compression occurs when all three stages are used, and maximum image quality occurs when only two are used.

In the preferred embodiment, separate look up tables are used for Y, Cr, and Cb, for each stage. The number of bits used in each stage with exemplary sizes for each look up table are shown in Table II below:

TABLE II

| | Luminance (Y) data | | | Chrominance (Cr, Cb) data | | |
|---|---|---|---|---|---|---|
| Stage | Input value | ROM result | Lookup table | Input value | ROM result | Lookup table |
| 1 | 8 | 8 | 64K × 8 | 8 | 8 | 64K × 8 |
| 2 | 8 | 9 | 64K × 9 | 8 | 7 | 64K × 7 |
| 3 | 9 | 9 | 256K × 9 | 7 | 7 | 16K × 7 |

Assuming that 7-bit and 9-bit words share the same 16-bit word, the above exemplary numbers for look up table sizes results in ROM 114 having an approximate size of 1 Meg bits (512K×16 bits). ROM 114 is preferably arranged so that the tables used for 2-stage compression and decompression reside entirely in the lower 512K bytes. This allows a smaller ROM to be used if 3-stage operation is not needed.

The timing of the compression operation according to a preferred embodiment of the present invention is as follows. Each field of video is processed at a rate of 1/60 sec. During a first 1/60 sec. interval, first stage coefficients for the first frame of video are read out of ROM 114 and stored in RAM 118. During the second 1/60 sec. interval, the second field of video is ignored and coefficients for the second stage of compression are computed. For 3-stage compression, the second and third stage coefficients are computed during this second 1/60 sec. interval. During the third 1/60 sec. interval, processing stage-1 of a second frame overlaps with outputting the completed first frame through PP I/F 120. The compression-decompression algorithm is described in greater detail in the above referenced, commonly assigned U.S. patent application Ser. No. 08/819,579.

In the preferred embodiment of the present invention, RAM 118 is large enough to store two complete fields of video data, with corresponding audio. At the maximum resolution, this corresponds to a minimum of 124K bytes. Control signals are supplied to RAM 118 that meet the specifications for a, for example, standard off-the-shelf DRAM. Refresh, for example, is performed as requited by the DRAM specification, whenever the data transfer rate falls below the minimum refresh rate of the DRAM.

Data is read from RAM 118 and sent to parallel port interface PP I/F 120 in bytes that are either sent directly, or split up into nibbles, depending upon the current port mode setting. After each byte or nibble is written, a strobe output is pulsed or toggled. Another byte or nibble will not be written until an acknowledge input is pulsed or toggled. At the end of each frame, data transfer stops until the host has requested the next frame. This allows the host to send other commands before the next frame is transmitted, if desired.

PP I/F 120 in combination with control logic 121 are designed to support a number of different handshaking protocols including IEEE-1284 standard nibble, byte, EPP and ECP, as well as non-standard byte and nibble modes. The non-standard byte and nibble modes process data faster than (e.g., twice as fast as) the IEEE standards. This is accomplished by rearranging handshaking sequences handled by a software driver.

The various blocks in IC 104 may be configured by the software driver that writes values to internal registers via the parallel port. Once programmed, register values select internal modes, control the external circuitry, or send commands to an external camera. Registers may be written before or after each complete video frame has been transferred to the host, or at any time while video processing is disabled.

The parallel interface of PP I/F 120 connects to an auxiliary standard parallel connector 126 to connect to, for example a printer as well as a host computer. When IC 104 is reset (e.g., by setting a mode register), the port is placed in a pass-through mode. In this mode, all parallel interface input signals are ignored (except as described below), output signals are tristated, and external pass-through buffers are enabled. This allows the host computer to send data to a printer, without interference from IC 104.

When IC 104 is in use, in playback mode, data is read in as a stream of bytes from PP I/F 120, and written to RAM 118. One frame of video data is sent at a time. Addressing of RAM 118 is arranged so that new data does not overwrite existing data until after it has been read out. Each frame of video data is followed by audio data if appropriate. A data request signal indicates whether data transfer should stop at the end of the current audio block, or if another audio block should be sent. The host may then send other commands before starting to send the following frame of data, if desired.

Decompression is performed in real-time in CIF and QCIF modes, and one frame at a time in 4CIF mode. For CIF and QCIF modes, each value from RAM 118 is treated as an index into a table of pixel blocks stored in ROM 114. For 4CIF data, each Y value is also an index into a table, while each Cr and Cb value is a raw (uncompressed) pixel value. There are separate ROM tables for Y, Cr, and Cb data, for each compression mode. Exemplary table sizes for various compression modes are provided in table III below.

TABLE III

| Table | Size of each input value (bits) | Size of data block (bytes) | Size of ROM table (bytes) |
|---|---|---|---|
| | Luminance (Y) data | | |
| 3-stage | 9 | 4 × 2 | 512 × 8 |
| 2-stage | 9 | 2 × 2 | 512 × 4 |
| | Chrominance (Cr, Cb) data | | |
| 3-stage | 7 | 4 × 2 | 128 × 8 |
| 2-stage | 7 | 2 × 2 | 128 × 4 |

Video data is interpolated by interpolator 136 before sending it to video encoder 138. The desired resolution and field modes are selected using setup commands. Horizontal interpolation for Y and Cr,Cb is done by averaging a pair of adjacent pixels. Vertical interpolation for Y data is done by averaging a pair of pixels from adjacent lines. Vertical interpolation for Cr,Cb data in CIF and QCIF modes is done by repeating the previous line of data without alteration, and for 4CIF mode by averaging a pair of pixels from adjacent lines. For QCIF format, the image is centered in the screen, surrounded by black pixels.

Figure 3:
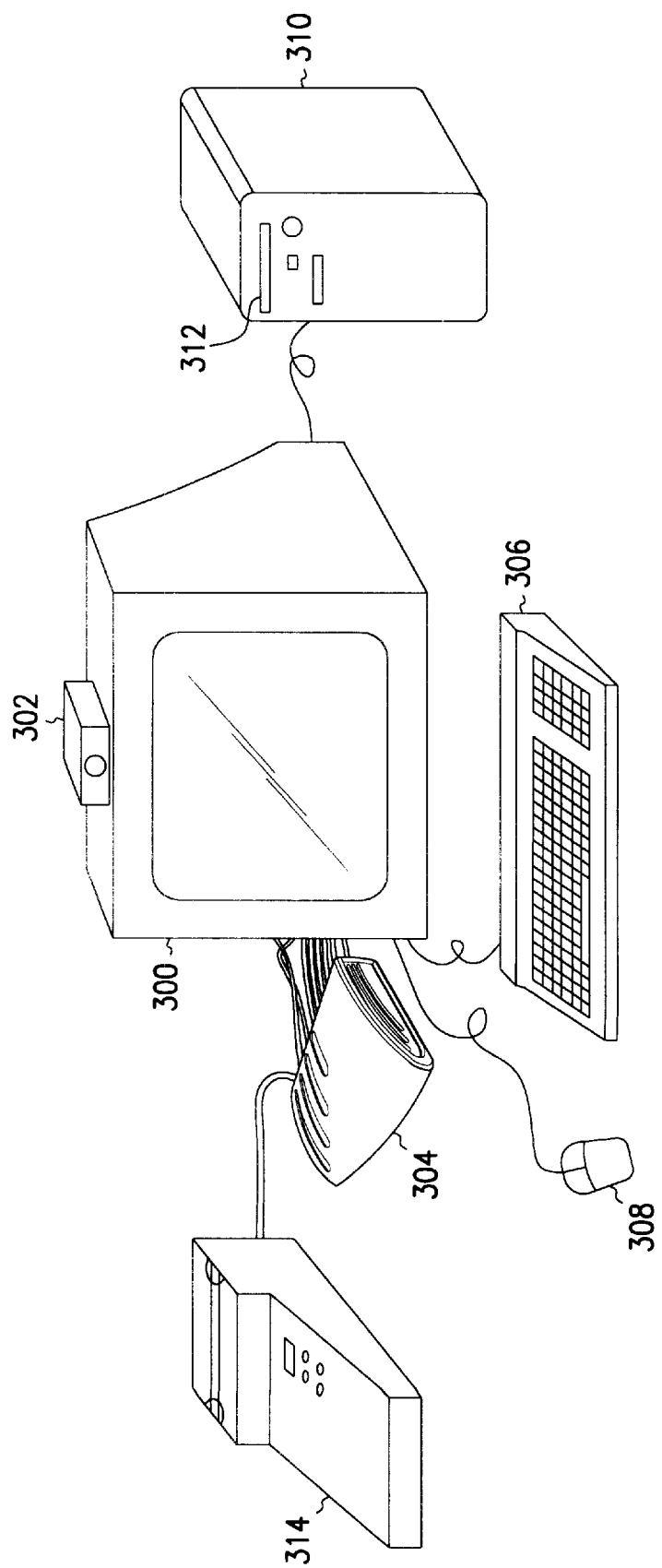
FIG. 3 shows an interactive video station using the video/audio data processing system according to the present invention.

Referring to FIG. 3, there is shown an interactive video station using the video/audio data processing system according to the present invention. The station includes a monitor 300, a camera unit 302 and the audio/video codec module 304 according to the present invention. The station further includes a cabinet 310 that houses a CD-ROM driver 312 or a hard driver (not shown) which may be utilized to store and retrieve system programming software. The station may further include a keyboard 306 and mouse 308. FIG. 3 also shows a printer 314 being coupled to the codec module 304. As discussed above, the codec parallel port according to the present invention provides a bypass connector to enable the user to connect other peripheral devices such as a printer to the computer.

While codec module 304 is shown as a plug-in module, similar circuitry may be employed on a card that may be mounted inside cabinet 310. Further, although a CD-ROM 312 is shown as the removable media, other removable tangible media including floppy disks, tape, and flash memory may be utilized. Cabinet 310 may also house familiar computer components (not shown) such as a processor, memory, and various support network elements. The interactive video station shown in FIG. 3 is but an example of a system suitable for use with the present invention. Other configurations of subsystems suitable for use with the present invention will be readily apparent to one of ordinary skill in the art.

In conclusion, the present invention offers a cost-effective system for real time record and playback of motion video through a computer interface port. The invention combines hardware implementing data compression and decompression using a table-based vector quantization algorithm, along with video input/output port and computer interface to enable a PC-type apparatus to process continuous-steam video and audio data in real time.

While the above is a complete description of the preferred embodiment of the present invention, it is possible to use various alternatives, modifications and equivalents. For example, although the detailed description uses a PC as the host computer, any other type of computing system including a network computer (NC) or other types of network appliances equipped with a video display unit can act as the host. Similarly, while the specific embodiment described above refers to the host interface port as a PC-type parallel port, other types of connector means can be utilized as required by the host computer.

Further, it is possible to increase the level of integration of the circuitry to include memory devices inside IC 104. This may remove certain bandwidth limitations and considerably speed up the processing of the data, without departing from the spirit of this invention. Also, IC 104 may be implemented by either a customized transistor-level circuit design, or by configuring commercially available programmable logic devices or filed programmable gate arrays. Therefore, the scope of the present invention should be determined not with reference to the above description but should, instead, be determined with reference to the appended claims, along with their full scope of equivalents.

What is claimed is:

1. A semiconductor chip implementing hardware for use in video data compression-decompression (codec) systems using table-based compression algorithms, comprising:
   a video input/output port adapted to receive and supply digital video data from/to an external video encoder-decoder;
   a first memory interface coupled to said video input/output port, said first memory interface adapted to interface with a first external memory device that stores coefficients for the table-based compression algorithm;
   a second memory interface coupled to said first memory interface, said second memory interface adapted to interface with a second external memory device that stores data corresponding to a video frame; and
   a computer interface coupled to said second memory interface, said computer interface being capable of communicating with a host computing system via a bidirectional bus,
   wherein, the semiconductor chip in combination with the external memory devices performs a video data compression-decompression using a table-based vector quantization algorithm.

2. The semiconductor chip of claim 1 further comprising:
   a scaler coupled between said video input/output port and said first memory interface, said scaler reducing a data rate of said digital video data in a record mode of operation; and
   an interpolator coupled between said video input/output port and said first memory interface, said interpolator for performing the opposite function of said scaler in a playback mode of operation.

3. The semiconductor chip of claim 2 further comprising:
   a word wrap block coupled between said second interface and said computer interface, said word wrap block converting eight 9-bit values into nine 8-bit words; and
   a word unwrap block coupled between said second interface and said first interface, said word unwrap block for converting 8-bit words into 9-bit values.

4. The semiconductor chip of claim 3 wherein said scaler performs a two to one scaling of said digital video data by averaging two adjacent pieces of data into one, and said interpolator performs the opposite of said scaler.

5. The semiconductor chip of claim 1 wherein said computer interface comprises:
   a plurality of registers for storing configuration data; and
   a plurality of state machines for configuring said computer interface to support various interface protocols, in response to data stored in said plurality of registers.

6. The semiconductor chip of claim 5 wherein said computer interface further comprises a bypass connector allowing said host computing system to connect to an external peripheral device via said computer interface.

7. The semiconductor chip of claim 1 wherein said first interface comprises a plurality of buffers for temporary storage of data, and wherein said first interface couples to said first memory via a 16-bit wide address bus and a 16-bit wide data bus.

8. The semiconductor chip of claim 1 wherein said hardware selectable performs either a two-stage or a three-stage hierarchical vector quantization compression-decompression.

9. The semiconductor chip of claim 6 wherein said computer interface is a parallel port interface suitable for making connection to a personal computer.

10. The semiconductor chip of claim 3 further comprising an audio interface port coupled to said second memory interface, said audio interface port being adapted to bidirectionally communicate audio data with an external audio codec device.

11. A semiconductor chip implementing hardware for use in video data decompression (codec) systems using table-based decompression algorithms, comprising:

a video input/output port adapted to receive and supply digital video data from/to an external video encoder-decoder;

a first memory interface coupled to said video input/output port, said first memory interface adapted to interface with a first external memory device that stores coefficients for a multistage hierarchical vector quantization decompression algorithm; and circuitry on the semiconductor chip that receives the coefficients and performs the decompression of the digital video data.

12. The semiconductor chip of claim 11 further comprising:

a scaler coupled between said video input/output port and said first memory interface, said scaler reducing a data rate of said digital video data in a record mode of operation; and an interpolator coupled between said video input/output port and said first memory interface, said interpolator for performing the opposite function of said scaler in a playback mode of operation.

13. The semiconductor chip of claim 12 further comprising:

a word wrap block that converts eight 9-bit values into nine 8-bit words; and a word unwrap block that converts 8-bit words into 9-bit values.

14. The semiconductor chip of claim 13 wherein said scaler performs a two to one scaling of said digital video data by averaging two adjacent pieces of data into one, and said interpolator performs the opposite of said scaler.

15. The semiconductor chip of claim 11 and further comprising a computer interface having a plurality of registers for storing configuration data and a plurality of state machines for configuring said computer interface to support various interface protocols, in response to data stored in said plurality of registers.

16. The semiconductor chip of claim 15 wherein said computer interface further comprises a bypass connector allowing said host computing system to connect to an external peripheral device via said computer interface.

17. A semiconductor chip implementing hardware for use in video data compression-decompression (codec) systems using table-based compression-decompression algorithms, comprising:

a video input/output port adapted to receive and supply digital video data from/to an external video encoder-decoder;

a first memory interface coupled to said video input/output port, said first memory interface adapted to interface with a first external memory device that stores coefficients for selectably performing either a two-stage or a three-stage hierarchical vector quantization compression-decompression; and circuitry on the semiconductor chip that receives the coefficients and performs the compression-decompression of the digital video data.

* * * * *